US011222076B2

(12) United States Patent
Cheung

(10) Patent No.: US 11,222,076 B2
(45) Date of Patent: Jan. 11, 2022

(54) DATA SET STATE VISUALIZATION COMPARISON LOCK

(71) Applicant: Microsoft Technology Licensing, LLC, Redmond, WA (US)

(72) Inventor: Chairy Chiu Ying Cheung, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 347 days.

(21) Appl. No.: 15/610,293

(22) Filed: May 31, 2017

(65) Prior Publication Data

US 2018/0349334 A1      Dec. 6, 2018

(51) Int. Cl.
*G06F 3/048* (2013.01)
*G06F 16/904* (2019.01)
*G06F 3/0482* (2013.01)

(52) U.S. Cl.
CPC .......... *G06F 16/904* (2019.01); *G06F 3/0482* (2013.01)

(58) Field of Classification Search
CPC .. G06F 16/248; G06F 16/2455; G06F 16/904; G06F 3/04842; G06F 16/26; G06F 16/9024; G06F 3/04847; G06F 17/2705; G06F 16/2428; G06F 16/287; G06F 16/951; G06F 3/04817; G06F 16/24; G06F 16/51; G06F 16/00; G06F 19/00; G06F 21/44; G06F 21/604; G06F 21/6218; G06F 3/011; G06F 3/015; G06F 3/0482; G06F 3/0484; G06F 3/048; G06F 3/0481; G06Q 10/103; G06T 11/206; H04L 67/10; H04L 2209/60; H04L 51/12; G06N 20/00; G06N 7/005; G06N 3/0445
See application file for complete search history.

(56) References Cited

U.S. PATENT DOCUMENTS 5,694,608 A  * 12/1997  Shostak ................ G06F 16/248
                                                               715/236
5,920,867 A  *  7/1999  Van Huben .......... G06F 16/1873
(Continued)

OTHER PUBLICATIONS

Mehmet Adil Yalcin, Rapid_and_expressive_tabular_data_exploration_for_novices, Aug. 2018, IEEE, vol. 24, No. 8, pp. 2339-2352 (Year: 2018).*

(Continued)

*Primary Examiner* — Steven B Theriault
(74) *Attorney, Agent, or Firm* — Workman Nydegger

(57) ABSTRACT

A user interface that allows the user to lock in a comparison state of an inspector control that provides a view on state of a data set being subjected to transformations. The inspector control visualizes a state of at least a portion of the data set (such as a column, table or database) as that data set is navigated by a navigation control. At least under some circumstances, the inspector control also visualizes a comparison state of the data set. A comparison lock control allows the comparison state of the data set to be locked at a particular comparison state regardless of the navigation control navigating the data set. Accordingly, until the comparison state is unlocked via a comparison unlock control, the inspector control visualizes a current state of the data set along with a visualization of the locked comparison state of the data set.

20 Claims, 8 Drawing Sheets

(56) References Cited

U.S. PATENT DOCUMENTS

| | | | | |
|---|---|---|---|---|
| 5,974,391 | A * | 10/1999 | Hongawa | G06Q 10/06 705/7.26 |
| 6,009,425 | A * | 12/1999 | Mohan | G06F 16/24557 |
| 6,188,405 | B1 * | 2/2001 | Czerwinski | G06F 3/0481 715/764 |
| 6,275,935 | B1 * | 8/2001 | Barlow | G06F 21/6209 713/155 |
| 6,295,541 | B1 * | 9/2001 | Bodnar | G06F 16/275 |
| 6,615,166 | B1 * | 9/2003 | Guheen | G06Q 10/06 703/27 |
| 6,725,428 | B1 * | 4/2004 | Pareschi | G06Q 10/10 715/205 |
| 6,934,717 | B1 * | 8/2005 | James | G06F 16/10 |
| 7,315,826 | B1 * | 1/2008 | Guheen | G06Q 10/06 705/7.29 |
| 7,318,066 | B2 * | 1/2008 | Kaufman | G06F 16/252 |
| 7,386,539 | B2 * | 6/2008 | Hung | G06F 16/951 707/695 |
| 7,584,078 | B2 * | 9/2009 | Junghans | G06Q 10/06 703/1 |
| 7,610,549 | B2 * | 10/2009 | Vignet | G06Q 10/06 715/227 |
| 7,676,294 | B2 * | 3/2010 | Baier | G05B 19/41865 700/108 |
| 7,676,455 | B2 * | 3/2010 | Ursitti | G06F 16/34 707/804 |
| 7,702,610 | B2 * | 4/2010 | Zane | G16H 50/70 707/999.001 |
| 7,716,188 | B2 * | 5/2010 | Feichtinger | G06F 16/93 707/690 |
| 7,809,687 | B2 * | 10/2010 | Cisler | G06F 16/3349 707/654 |
| 7,818,663 | B2 * | 10/2010 | Khaba | G06F 16/93 715/229 |
| 7,856,424 | B2 * | 12/2010 | Cisler | G06F 9/451 707/654 |
| 7,860,839 | B2 * | 12/2010 | Cisler | G06F 11/1451 707/654 |
| 7,904,913 | B2 * | 3/2011 | Sim-Tang | G06F 11/1448 719/318 |
| 7,948,492 | B2 * | 5/2011 | Stluka | G06Q 10/06 345/440.2 |
| 7,979,404 | B2 * | 7/2011 | Sim-Tang | G06F 16/174 707/694 |
| 7,996,774 | B1 * | 8/2011 | Sidenur | G06Q 10/10 715/743 |
| 8,001,481 | B2 * | 8/2011 | Chakra | G06F 11/3664 715/772 |
| 8,010,900 | B2 * | 8/2011 | Hart | G06F 11/1448 715/747 |
| 8,108,429 | B2 * | 1/2012 | Sim-Tang | G06F 16/125 707/790 |
| 8,131,723 | B2 * | 3/2012 | Sim-Tang | G06F 16/1873 707/737 |
| 8,140,581 | B2 * | 3/2012 | Flynn | G06F 8/20 345/619 |
| 8,161,410 | B2 * | 4/2012 | Bray | G06F 3/04815 715/848 |
| 8,185,463 | B1 * | 5/2012 | Ball | G06Q 40/025 705/36 R |
| 8,200,527 | B1 * | 6/2012 | Thompson | G06Q 10/06398 705/7.39 |
| 8,335,775 | B1 * | 12/2012 | Sedlar | G06F 16/176 707/695 |
| 8,341,557 | B2 * | 12/2012 | Pisula | G06F 3/04886 715/863 |
| 8,364,648 | B1 * | 1/2013 | Sim-Tang | G06F 16/2358 707/674 |
| 8,442,996 | B2 * | 5/2013 | Maim | G06F 21/6227 707/791 |
| 8,499,036 | B2 * | 7/2013 | Kalthoff | G06F 21/62 709/204 |
| 8,571,882 | B1 * | 10/2013 | Teitelbaum | G06F 16/27 705/2 |
| 8,666,919 | B2 * | 3/2014 | Miranda | G06N 5/025 706/45 |
| 9,063,725 | B2 * | 6/2015 | Tseitlin | G06F 8/20 |
| 9,165,360 | B1 * | 10/2015 | Bates | G06T 7/0014 |
| 9,197,738 | B2 * | 11/2015 | Peev | H04M 1/673 |
| 9,443,336 | B2 * | 9/2016 | Benson | G06T 11/206 |
| 9,461,876 | B2 * | 10/2016 | Dusen | H04L 41/04 |
| 9,710,529 | B2 * | 7/2017 | Singh | G06F 16/2365 |
| 9,880,753 | B2 * | 1/2018 | Sawicki | G06F 3/0607 |
| 10,395,128 | B2 * | 8/2019 | Van Os | G06K 9/00912 |
| 10,416,800 | B2 * | 9/2019 | Karunamuni | G06F 3/04883 |
| 10,417,440 | B2 * | 9/2019 | Reedy | G06F 21/6218 |
| 10,430,600 | B2 * | 10/2019 | Bahrs | |
| 10,534,522 | B2 * | 1/2020 | Lingappa | G06F 3/04842 |
| 2002/0089551 | A1 * | 7/2002 | Hugh | G06F 16/904 715/853 |
| 2002/0161778 | A1 * | 10/2002 | Linstedt | G06F 16/254 |
| 2002/0165724 | A1 * | 11/2002 | Blankesteijn | G06Q 30/06 705/1.1 |
| 2003/0070000 | A1 * | 4/2003 | Coker | G06F 9/547 719/318 |
| 2003/0117434 | A1 * | 6/2003 | Hugh | G06F 16/252 715/744 |
| 2003/0149586 | A1 * | 8/2003 | Chen | G06Q 10/063 705/7.11 |
| 2003/0185305 | A1 * | 10/2003 | MacInnis | G06F 9/3861 375/240.25 |
| 2004/0125150 | A1 * | 7/2004 | Adcock | G06F 16/54 715/810 |
| 2005/0021541 | A1 * | 1/2005 | Rangadass | G06Q 10/06 |
| 2005/0027495 | A1 * | 2/2005 | Matichuk | G06F 9/45512 703/2 |
| 2005/0159990 | A1 * | 7/2005 | Barrett | G06Q 10/06312 705/7.22 |
| 2005/0240943 | A1 * | 10/2005 | Smith | G06F 9/465 719/328 |
| 2006/0174209 | A1 * | 8/2006 | Barros | G06F 3/0483 715/764 |
| 2007/0061487 | A1 * | 3/2007 | Moore | G06F 16/27 709/246 |
| 2007/0112714 | A1 * | 5/2007 | Fairweather | G06F 8/427 706/46 |
| 2007/0250789 | A1 * | 10/2007 | Bell | G06F 3/0486 715/800 |
| 2008/0034018 | A1 * | 2/2008 | Cisler | G06F 11/1451 |
| 2008/0132790 | A1 * | 6/2008 | Burton | A61B 8/06 600/447 |
| 2008/0155468 | A1 * | 6/2008 | Rosander | G16H 30/40 715/810 |
| 2008/0189238 | A1 * | 8/2008 | Iyer | G06F 16/22 |
| 2008/0189639 | A1 * | 8/2008 | Iyer | G06F 17/245 715/771 |
| 2009/0088875 | A1 * | 4/2009 | Baier | G05B 19/41865 700/83 |
| 2009/0096812 | A1 * | 4/2009 | Boixel | G06Q 10/00 345/646 |
| 2009/0262088 | A1 * | 10/2009 | Moll-Carrillo | A63B 24/0062 345/173 |
| 2010/0114939 | A1 * | 5/2010 | Schulman | G06F 11/3672 707/769 |
| 2010/0269049 | A1 * | 10/2010 | Fearon | G06Q 10/109 715/744 |
| 2011/0098928 | A1 * | 4/2011 | Hoffman | G06Q 50/01 702/5 |
| 2011/0175905 | A1 * | 7/2011 | Hao | G06T 11/206 345/419 |
| 2011/0225551 | A1 * | 9/2011 | Bells | G06Q 10/109 715/853 |
| 2011/0251926 | A1 * | 10/2011 | Chen | G06Q 30/02 705/27.1 |
| 2012/0150791 | A1 * | 6/2012 | Willson | G06F 16/254 707/600 |
| 2012/0224057 | A1 * | 9/2012 | Gill | H04L 63/102 348/143 |

(56) References Cited

U.S. PATENT DOCUMENTS

| | | | | |
|---|---|---|---|---|
| 2013/0019028 A1* | 1/2013 | Myers | G06F 17/2235 | 709/246 |
| 2013/0097234 A1* | 4/2013 | Beinvel | G06Q 10/101 | 709/204 |
| 2013/0179761 A1* | 7/2013 | Cho | G06F 17/2235 | 715/202 |
| 2013/0231980 A1* | 9/2013 | Elgart | G06Q 50/20 | 705/7.38 |
| 2013/0325788 A1* | 12/2013 | Brown | G06F 16/254 | 707/602 |
| 2014/0013201 A1* | 1/2014 | Erlandsson | G06F 3/04845 | 715/230 |
| 2014/0040182 A1* | 2/2014 | Gilder | G06F 17/2264 | 707/602 |
| 2014/0068439 A1* | 3/2014 | Lacaze | G06F 3/0484 | 715/720 |
| 2014/0101178 A1* | 4/2014 | Ginter | G06F 16/90335 | 707/755 |
| 2014/0223573 A1* | 8/2014 | Reedy | G06F 21/6218 | 726/26 |
| 2014/0267424 A1* | 9/2014 | Benson | G06T 11/206 | 345/636 |
| 2014/0282187 A1* | 9/2014 | Mackinlay | G06F 16/904 | 715/771 |
| 2014/0283008 A1* | 9/2014 | Daino | G06F 21/6218 | 726/17 |
| 2014/0372953 A1* | 12/2014 | Laurance | G06F 3/04817 | 715/835 |
| 2015/0169193 A1* | 6/2015 | Assadian | G06F 3/04842 | 715/771 |
| 2015/0199010 A1* | 7/2015 | Coleman | A61B 5/0006 | 345/156 |
| 2015/0246231 A1* | 9/2015 | Martens | A61N 1/3605 | 705/2 |
| 2015/0314199 A1* | 11/2015 | Chapman | G06Q 10/103 | 463/42 |
| 2015/0347542 A1* | 12/2015 | Sullivan | G06F 16/254 | 707/602 |
| 2015/0363478 A1* | 12/2015 | Haynes | G06F 16/26 | 707/625 |
| 2016/0004417 A1* | 1/2016 | Bates | G06F 3/04847 | 715/716 |
| 2016/0012099 A1* | 1/2016 | Tuatini | G06F 16/2365 | 707/689 |
| 2016/0034574 A1* | 2/2016 | Kang | H04M 1/72522 | 715/720 |
| 2016/0055225 A1* | 2/2016 | Xu | G06F 16/27 | 707/624 |
| 2016/0086241 A1* | 3/2016 | Proulx | H04L 67/26 | 705/26.4 |
| 2016/0086361 A1* | 3/2016 | Ball | G06Q 10/00 | 345/440 |
| 2016/0092526 A1* | 3/2016 | Kothari | G06F 16/219 | 707/602 |
| 2016/0103592 A1* | 4/2016 | Prophete | G06F 3/04845 | 715/771 |
| 2016/0103872 A1* | 4/2016 | Prophete | G06F 16/2428 | 707/722 |
| 2016/0103886 A1* | 4/2016 | Prophete | G06F 16/248 | 707/722 |
| 2016/0104003 A1* | 4/2016 | Schneider | G06F 16/254 | 726/1 |
| 2016/0210334 A1* | 7/2016 | Prophete | G06F 3/04847 | |
| 2016/0260174 A1* | 9/2016 | Singh | G06Q 40/06 | |
| 2016/0291845 A1* | 10/2016 | Lingappa | G06F 40/169 | |
| 2016/0328406 A1* | 11/2016 | Convertino | G06F 3/04842 | |
| 2016/0335731 A1* | 11/2016 | Hall | G06Q 10/067 | |
| 2016/0353264 A1* | 12/2016 | Lim | H04W 4/90 | |
| 2017/0038915 A1* | 2/2017 | Choi | G06F 3/0481 | |
| 2017/0046374 A1* | 2/2017 | Fletcher | G06F 3/0482 | |
| 2017/0124455 A1* | 5/2017 | Rope | G06F 16/248 | |
| 2017/0195425 A1* | 7/2017 | Tian | H04L 41/0803 | |
| 2017/0255784 A1* | 9/2017 | Donohoe | G06F 21/604 | |
| 2017/0289199 A1* | 10/2017 | Barday | G16H 10/60 | |
| 2017/0364568 A1* | 12/2017 | Reynolds | G06F 3/0482 | |
| 2017/0371765 A1* | 12/2017 | Gadi | G06F 11/366 | |
| 2018/0012080 A1* | 1/2018 | Glaser | H04L 12/2809 | |
| 2018/0018602 A1* | 1/2018 | DiMaggio | G16H 10/60 | |
| 2018/0074786 A1* | 3/2018 | Oberbreckling | G06F 7/02 | |
| 2018/0208004 A1* | 7/2018 | Fraelich | B60C 23/20 | |
| 2018/0239991 A1* | 8/2018 | Weller | G06K 9/0063 | |
| 2018/0300351 A1* | 10/2018 | Glover | G06F 17/2211 | |
| 2019/0156826 A1* | 5/2019 | Cromack | G06F 40/10 | |
| 2019/0200844 A1* | 7/2019 | Shelton, IV | A61B 1/00009 | |
| 2019/0380388 A1* | 12/2019 | Amorde | A24F 47/008 | |

OTHER PUBLICATIONS

Rafael Veras, Using_multiple_coordinated_views_for_multiple_dataset_analysis, 2009, 2009 13th International Conference Information Visualization, pp. 627-632 (Year: 2009).*

A. Brinkmann, S. Effert, M. Heidebuer and M. Vodisek, Realizing Multilevel Snapshots in Dynamically Changing Virtualized Storage Environments, (Year: 2006).*

[Continued from U]International Conference on Networking, International Conference on Systems and International Conference on Mobile Communications and Learning Technologies (ICNICONSMCL'06), Morne, Mauritius, 2006, pp. 26-26, doi: 10.1109/ICNICONSMCL.2006.182. (Year: 2006).*

Muller and Schumann, "Visualization methods for time-dependent data—an overview," Proceedings of the 2003 Winter Simulation Conference, 2003., New Orleans, LA, USA, 2003, pp. 737-745 vol. 1, doi: 10.1109/WSC.2003.1261490. (Year: 2003).*

Gilks, Peter, "A Rough Guide to Dashboard Actions", https://public.tableau.com/en-us/s/blog/2015/06/rough-guide-dashboard-actions, Published on: Jun. 16, 2015, 18 pages.

Shoukry, Youssef, "Explore your Insightcentr data with Power BI", https://powerbi.microsoft.com/en-us/blog/explore-your-insightcentr-data-with-power-bi/, Published on: Oct. 28, 2016, 8 pages.

Moritz, et al., "Trust, but Verify: Optimistic Visualizations of Approximate Queries for Exploring Big Data", In Proceedings of CHI, Apr. 3, 2017, 12 pages.

Park, et al., "Database Learning: Toward a Database that Becomes Smarter Every Time", In Proceedings of the Computing Research Repository, Mar. 2017, 14 pages.

Ahmad, et al., "Real-Time Anomaly Detection for Streaming Analytics", In Proceedings of the Computing Research Repository, Jul. 2016, 10 pages.

Hoffswell, et al., "Visual Debugging Techniques for Reactive Data Visualization", In Proceedings of Computer Graphics Forum, vol. 35, Issue 3, Jun. 2016, 10 pages.

"ETL Tools", http://www.etltools.org/data-cleansing.html, Published on: Nov. 11, 2009, 2 pages.

* cited by examiner

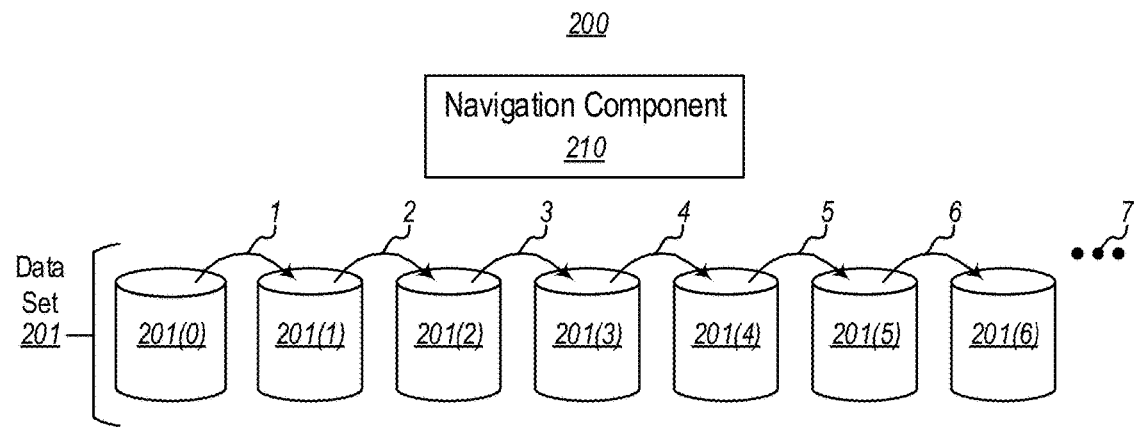
Figure 2
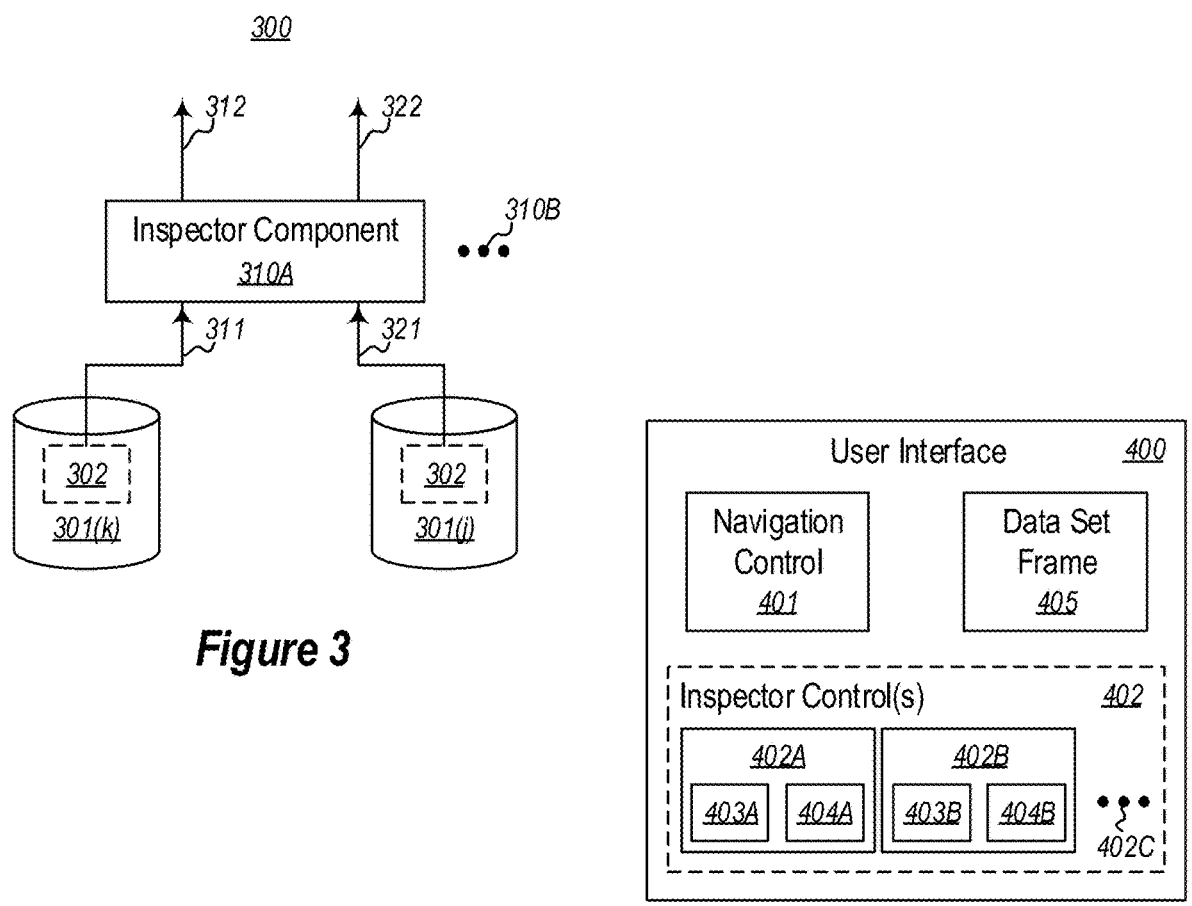
Figure 3
Figure 4

DATA SET STATE VISUALIZATION COMPARISON LOCK

BACKGROUND

Computing systems and associated networks have greatly revolutionized our world ushering in what is now commonly called the "information age". The amount of accessible data has grown considerably with the rapid growth of database and cloud computing technologies. Accessible data is often organized into a data set. A data set might be a table or group of tables, a database or group of tables, unstructured data or combinations thereof. Sometimes the size of the data set is quite large.

In order to properly extract data of interest from a data set, the data set may be subjected to multiple transformations. For instance, some of the transformations may be cleansing raw data so as to be in consumable form—which is sometimes referred to as "cleansing" the data. For instance, the raw data may be subjected to filtering, redundant data may be removed, data types may made to be a uniform pattern, and so forth.

Conventional tools for applying transforms to raw data allow for navigation from one transform to the next as the data set is subject to the transformations. However, navigation may also be made backwards in time, to restore the data set to its state after a prior transform. Furthermore, conventional software allows for the user to use inspector controls to view state of the data set at the current state. Furthermore, the inspector may show some visualization of how the state changed in the immediate prior step—which allows for quick visualization of what state changed in the last transformation.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to a user interface that allows the user to lock in a comparison state of an inspector control that provides a view on state of a data set being subjected to transformations. The inspector control visualizes a state of at least a portion of the data set (such as a column, table or database) as that data set is navigated by a navigation control. At least under some circumstances, the inspector control also visualizes a comparison state of the data set. A comparison lock control allows the comparison state of the data set to be locked at a particular comparison state regardless of the navigation control navigating the data set. Accordingly, until the comparison state is unlocked via a comparison unlock control, the inspector control visualizes a current state of the data set along with a visualization of the locked comparison state of the data set.

In some embodiments, if the current state of the data set differs from the comparison state by more than a threshold, an alert is visualized in the inspector control. Thus, once the user finds a state of the data set that appears suitable, the user can lock in that state. Accordingly, if further transformations are to be made, the user can immediately see if the state of the data set has departed too far from that desirable state. In some embodiments, the threshold may be customizable by the user and/or may be a function of multiple states of the data set.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates progress of a data set as it undergoes multiple transformations, and may be navigated via a navigation component;

FIG. 3 illustrates an inspector environment in which an inspector component operates to provide signals represent a current and comparison state of at least a portion of the data set under inspection;

FIG. 4 illustrates a user interface that includes a navigation control that may be used to direct the navigation component of FIG. 2, and at least one inspector control that may be used to direct an inspector component of FIG. 3;

FIG. 5 illustrates a user interface that represents an initial state of the walkthrough, the user interface including a progress frame that shows progress of the data set through transformations and that may be used to navigate through the various states of the data set, a data set frame that displays the data set in its current state, and an inspector control that views current and potentially also comparison state of the data set;

FIG. 6 illustrates a user interface, which is similar to the user interface of FIG. 5, except that the user has caused a fourth transformation (a filter operation) to be performed on the data set;

FIG. 7 illustrates a user interface, which is similar to the user interface of FIG. 6, except that the user has activated a lock control to lock the comparison state of the inspector control;

FIG. 8 illustrates a user interface, which is similar to the user interface of FIG. 7, except the user has applied two further transformations to the data set;

FIG. 9 illustrates a user interface, which is similar to the user interface of FIG. 8, except the user has navigated back to the third transformation of the data set; and FIG. 10 illustrates a user interface that is similar to the user interface of FIG. 9, except that the user has selected the lock control again to unlock the comparison state of the inspector control.

DETAILED DESCRIPTION

At least some embodiments described herein relate to a user interface that allows the user to lock in a comparison state of an inspector control that provides a view on state of a data set being subjected to transformations. The inspector control visualizes a state of at least a portion of the data set (such as a column, table or database) as that data set is navigated by a navigation control. At least under some circumstances, the inspector control also visualizes a comparison state of the data set. A comparison lock control allows the comparison state of the data set to be locked at a particular comparison state regardless of the navigation control navigating the data set. Accordingly, until the comparison state is unlocked via a comparison unlock control, the inspector control visualizes a current state of the data set along with a visualization of the locked comparison state of the data set.

In some embodiments, if the current state of the data set differs from the comparison state by more than a threshold, an alert is visualized in the inspector control. Thus, once the user finds a state of the data set that appears suitable, the user can lock in that state. Accordingly, if further transformations are to be made, the user can immediately see if the state of the data set has departed too far from that desirable state. In some embodiments, the threshold may be customizable by the user and/or may be a function of multiple states of the data set.

Because the principles described herein operate in the context of a computing system, a computing system will be described with respect to FIG. 1. Then, the user interface and mechanisms for interacting with a user will be described with respect to FIGS. 2 through 4. Finally, a specific user interface walkthrough will be described with respect to FIGS. 5 through 10.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
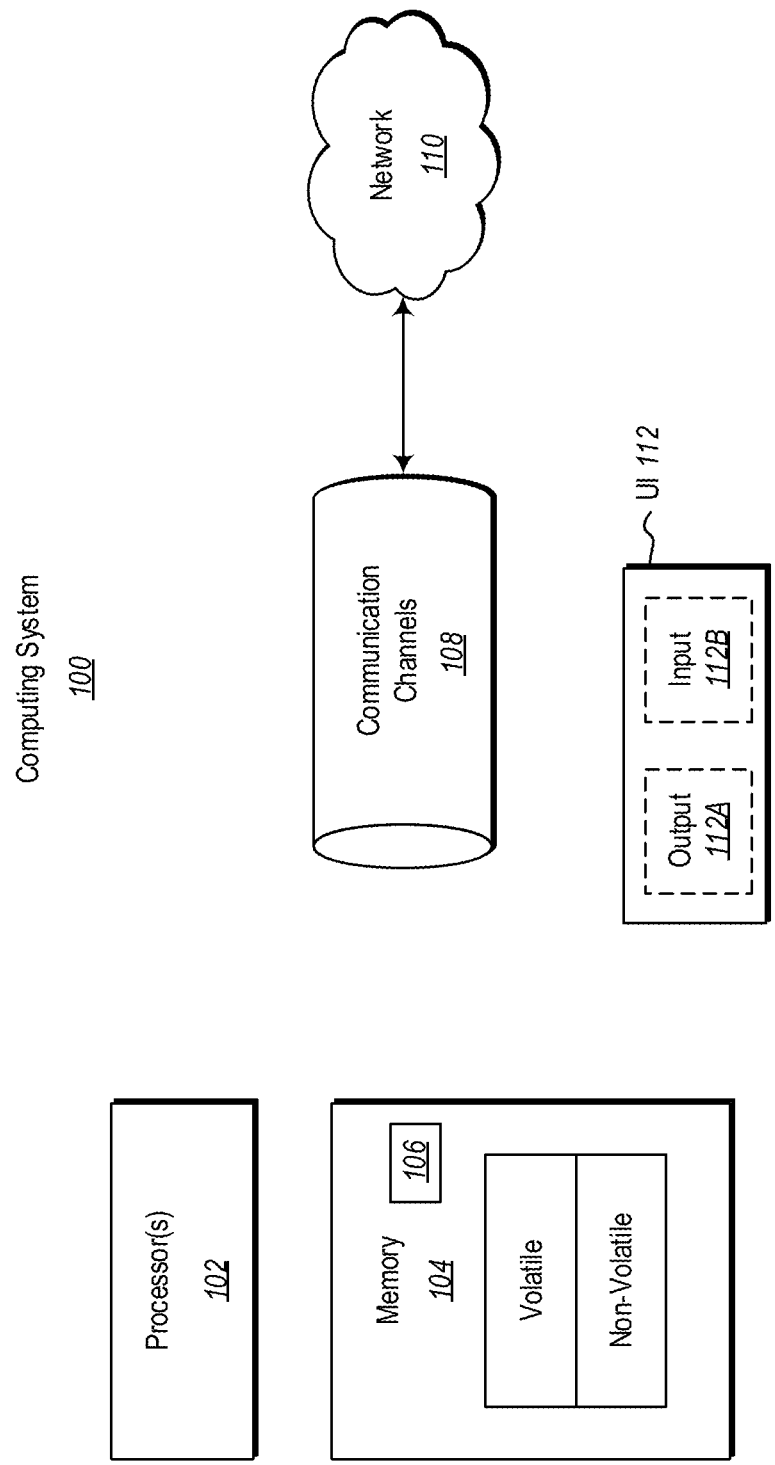
FIG. 1 illustrates an example computer system in which the principles described herein may be employed.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms, virtual reality, and so forth. Examples of input mechanisms 112B might include, for instance, microphones, touchscreens, holograms, virtual reality, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

FIG. 2 symbolically illustrates a navigation environment 200 in which there is progress of a data set 201 as it undergoes multiple transformations. In the illustrated progress, there are six illustrated transformations 1 through 6, though the ellipses 7 symbolically represents that a data set may undergo any number of transformations in the process of preparing that data set for consumption. By convention, the data set 201 in its condition after transformation n (where "n" is a whole number) will be referred to as data set 201(n). Thus, the data set 201 after the transformations 1, 2, 3, 4, 5 and 6 are labelled 201(1), 201(2), 201(3), 201(4), 201(5) and 201(6), respectively. In its initial state, the data set 201 is labelled 201(0).

A navigation component 210 controls movement through the transformation of the data set. The navigation component 210 may actually cause each transformation to happen upon the data set when navigating forwarding in time. Alternatively or in addition, such transformations may be caused by a separate component than the navigation component. The navigation component 210 may also navigate backwards in time, returning a data set to how it existed at a prior point in time. For instance, the navigation component 210 might cause each of the transformations 1 through 6 to occur in order. Then, once the data set reaches state 201(6), the navigation component might return the data set to the state 201(4) that the data set 201 existed in after the transformation 4 happened. The navigation component 210 operates at the control of a navigation control that is described hereinafter with respect to a user interface of FIG. 4. As an example, the data set 201 may be a table or tables, a column or columns of a table, a row or rows or a table, a database or databases, or combinations thereof.

In addition to a navigation component 210, there may be one or more inspector components, which generates a signal representing state of at least a portion of the data state. For instance, FIG. 3 illustrates an inspector environment 300 in which an inspector component 310A is evaluating a state 311 of a portion 302 of a data set 301(k), and generating a signal 312 that represents either that state 311 directly, or a function of the state 312. The state 311, may also be referred to herein as a "current state". As an example, the data set 301 may be the data set 201 at any stage of its progress through the transformations 1 through 6. Thus, the data set 301(k) may be the data set 201(k), where "k" represents any whole number up to and including the total number of transformations that the data set has experienced (in this example, 6). The portion 302 of the data set may be only a portion, or perhaps the entirety of the data set.

The inspector component 310A also evaluates a state 321 of the same portion 302 of a data set 301(j) at a different point in time. This state 321 may also be referred to herein as a "comparison state". As an example, the data set 301(j) may be the data set 201(j) at any portion of its progress through the transformations 1 through 6, where j might be any whole number other than k. The inspector component 310 also generates a signal 322 that represents either the comparison state 321 directly, or a function of the comparison state 321. The inspector component 310 operates at the control of an inspector control that is described hereinafter with respect to a user interface of FIG. 4. The ellipses 310B represents that there may be any number of inspector components that allow for a view of states of the same or a different data set, and that may operate the same as the operation described for the inspector component 310A.

FIG. 4 illustrates a user interface 400 that includes a navigation control 401, and at least one inspector control 402A. There may be more than one inspector control as represented by the additional illustrated inspector control 402B as well as the ellipses 402C. The one or more inspector controls illustrated in the user interface 400 will also be referred to collectively as "inspector control(s) 402".

The user of the user interface 400 may interface with the navigation control 401 to thereby cause the navigation component 210 of FIG. 2 to navigate through the various data set states 201(n) of FIG. 2, causing the current data set state to be displayed in a data set frame 405. For instance, the user may interface with the navigation control 401 to cause the transformations 1 through 6 to occur (transitioning the data set 201 through states 201(0) to 201(6) in order), when navigating forwarding in time. The user may also interface with the navigation control 401 to thereby cause the navigation component 210 to move the data set 201 backwards in time to a prior transformation. For instance, the user might navigate from the data set 201(6) back to the data set 201(3) in the prior state, when moving backwards in time to prior transformations.

The user of the user interface 400 may also interface with an inspector control 402(a) to thereby cause the inspector component 310A of FIG. 3 to select a state of the data set to produce a signal representing a current state (and also potentially a comparison state) of at least a part of that data set, and to visualize that produced signal(s). For instance, the user might cause the inspector component 310 to generate the signal 312 and thereby cause the inspector control 402(a) to visualize the state of the signal 312 (and the current state of the part 302 of the dataset 301(k)) on the user interface 400. Furthermore, under at least some circumstance, the inspector control 402(a) may also visualize the state of the signal 322 (and the comparison state of the part 302 of the dataset 301(j)) on the user interface 400. Thus, for instance, a current navigated state of the data set (e.g., data set 301(k)) may be compared with a comparison state of the data set (e.g., data set 301(j)).

The visualized state may be an aggregated state of the portion of the data set. For instance, the state might be an averaged value of particular columns of a table, an overall size of the table, and so forth. Alternatively or in addition, the visualized state may be direct state of the underlying data. For instance, the visualization may be a scatter plot showing actual values of data entries in the underlying data set.

As represented by the inspector component 402B, there may be multiple inspector controls. When the inspector component 402B is also used to visualize state of the same part of the data set as compared to the inspector component 402A, more than three states of that same part of the data set may be visualized. Thus, the inspector controls 402A and 402B may be used to compare a current state of the part of the data set to two comparison states of the data set. That said, in some embodiments, a single inspector control may be used to create multiple comparison state visualizations. In the example of FIGS. 5 through 10, however, the inspector control has at most one comparison state that is visualized.

The inspector control 402A includes or is associated with a comparison lock control 403A that causes the comparison state of the data set to be locked at a particular comparison state regardless of the navigation control navigating the data set. Accordingly, until the comparison state is unlocked, a current state of the data set as visualized in the inspector control is visualized along with a visualization of the locked comparison state. The inspector control 402A also includes or is associated with a comparison unlock control 404A that unlocks a previously locked comparison state of the inspector control 402A. In some embodiments, when the comparison state is unlocked, there is still a comparison state, but such a state is dependent on the current state of the data set. The comparison lock control 403A and the comparison unlock control 404A may be a same control, such as a lock control that toggles the comparison state of the inspector control between a locked and unlocked state.

As an example, suppose that when unlocked, the comparison state is the immediate prior state of the data set and that the unlocked comparison state is only displayed when navigating forward in time one transformation at a time. Now suppose that the user begins transforming the data set 201 from its initial state 201(0) sequentially to the state 201(6).

At first, the data set 201 is in its initial state 201(0). There is no comparison state possible since there is but one state that the data set 201 has thus far experienced. In this case, the inspector control 402A might visualize the state 201(0).

Now suppose the user navigates the data set 201 through transformation 1 to arrive at state 201(1). In that case, the current state visualized in the inspector control 402A may be the state 201(1), but there the visualized comparison state may be of state 201(0).

Next, suppose the user then navigates the data set 201 through transformation 2 to arrive at state 201(2). In that case, the current state visualized in the inspector control 402A may be the state 201(2). However, because the visualized comparison state is not yet locked in this example. Thus, the visualized comparison state moves to state 201(1).

Suppose the user then navigates the data set 201 through transformation 3 to arrive at state 201(3). In that case, the current state visualized in the inspector control 402A may be the state 201(3). However, because the visualized comparison state is still not yet locked in this example, the visualized comparison state moves to state 201(2). Now suppose that the user likes state 201(3) of the data, and does not want to transform the data too much to depart too far from the state 201(3). So the user interfaces with the comparison lock control 403A to lock the comparison state of the inspector control at state 201(3).

Now whenever the user navigates to any other state, the visualized comparison state will remain locked at the state 201(3), at least until the comparison unlock control 404A is activated. Accordingly, when the user navigates through transformation 4 to arrive at state 201(4), the inspector control 402A compares the current state 201(4) with the locked comparison state 201(3). When the user navigates through transformation 5 to arrive at state 201(5), the inspector control 402A compares the new current state 201(5) again with the lock comparison state 201(3). Finally, when the user navigates through transformation 6 to arrive at state 201(6), the inspector control 402A compares the new current state 201(6) with the locked comparison state 201(3).

Now suppose that the user selects the comparison unlock control 404A, in that case, the comparison state is unlocked, and perhaps goes to a default comparison state that depends on the current state. For instance, the default comparison state night be the immediate prior state when engaged in transformations forward in time. Accordingly, when unlocked, the inspector control 402A may update to compare the current state 201(6) with the comparison state 201(5).

Now in this example, suppose that when in state 201(6), the user again activates the comparison lock control 403A. This causes the comparison state to lock at state 201(6). If the user were to jump backwards in time to the state 201(3), the inspector control 402A would then visualize the current state 201(3) with the locked comparison state 201(6).

The other inspector controls 402 may also have similar comparison lock controls and comparison unlock controls. Thus, inspector control 402B is illustrated as including or being associated with a comparison lock control 403B as well as a comparison unlock control 404B. Thus, the inspector controls 402 may each have their comparison states locked and unlocked as desired by the user.

The inspector controls 402 may each also visualize an alert when the current state of the data set as visualized in the inspector control differs from the visualized comparison state by more than a threshold. The alert may be displayed in whatever manner is appropriate given how the inspector control is visualizing data. The threshold may be customizable by the user, and may be a single dimension (or feature) of the data set, or may be a function of multiple features (or dimensions) of the data set.

An example walkthrough of a more specific user interface will now be described with respect to FIGS. 5 through 10.

Figure 5:
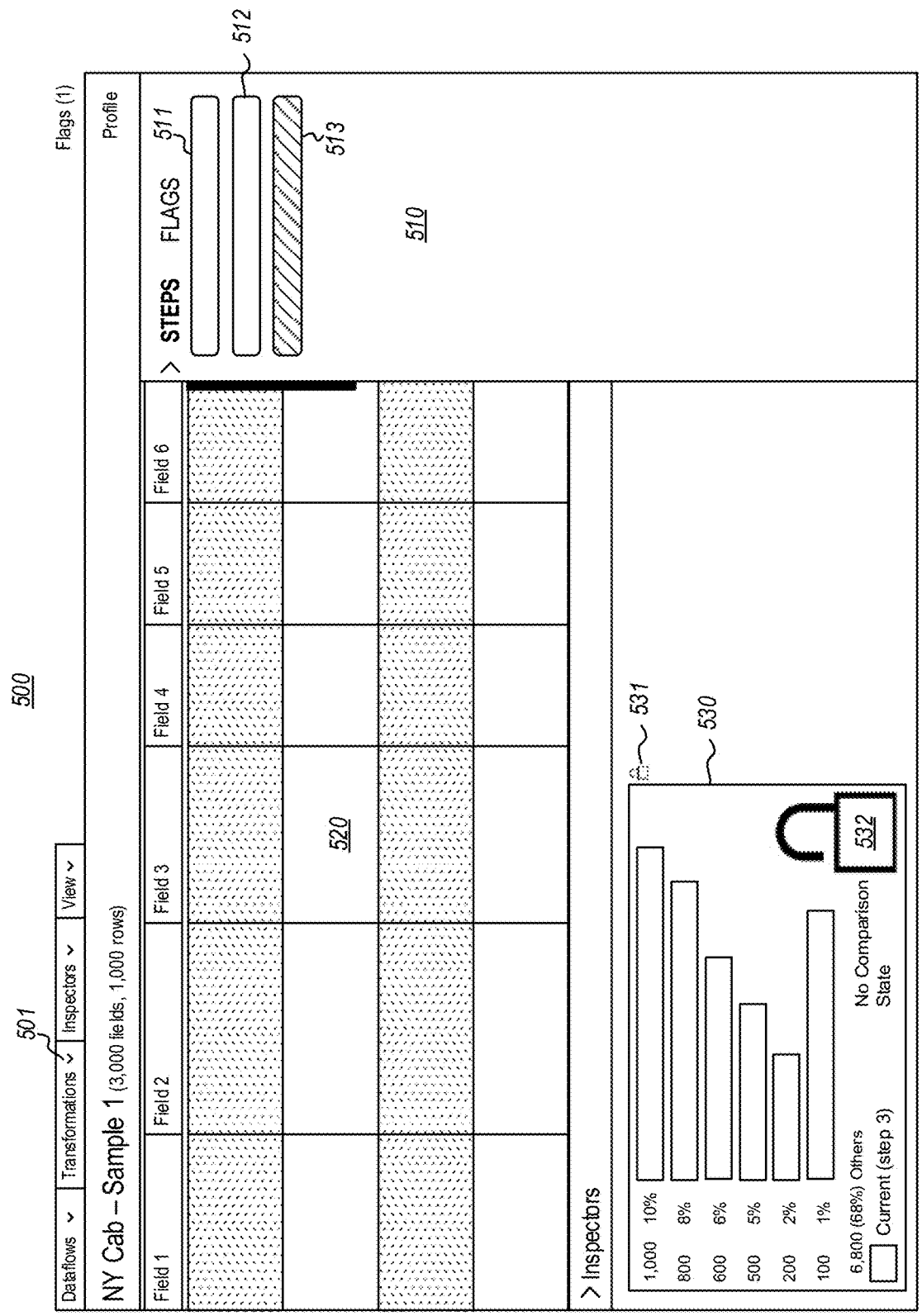
FIGS. 5 through 10 illustrate an example walkthrough of interaction with a specific user interface using the principles described herein.

FIG. 5 illustrates a user interface 500 that represents an initial state of the walkthrough. The user interface 500 includes a progress frame 510 that shows progress and a current state in preparing the data set. In this case, the progress frame 510 shows that the data set has undergone three transformations (as represented by elements 511, 512 and 513, for the respective first, second, and third transformations). The progress frame also shows that the current illustrated state of the data set is the after the third transformation as represented by the element 513 being filed with diagonal hash marking.

The interface 500 also includes a data set frame 520 for visualizing the data set in the current state highlighted in the progress frame 510. The user can navigate through the three transformations by selecting the respective elements in the progress frame 510. Thus, the progress frame 510 represents an example of the navigation control 401 of FIG. 2. The data set frame 520 represents an example of the data set frame 403 of the user interface 400 of FIG. 4. The user can apply transformations to the data set by selecting transformations from the drop down menu 501 of FIG. 5. Thus, the drop down menu 501 also represents an example of the navigation control 401 of FIG. 4, when used to further transform the data set and add transformations to the progress frame 510.

The user interface 500 also shows an inspector control 530 (in this case a bar chart), which provides a view of features of the data set as the data set currently being viewed in the data set frame 520. The inspector control 530 is an example of the inspector control 402A of FIG. 4. The inspector control has an associated lock element 531, which may be used to toggle the comparison state of the inspector control 530 between a locked states an unlocked state. Thus, the lock control 531 represents an example of both the comparison lock control 403A and the comparison unlock control 404A of FIG. 4. Presently, the lock control 531 shows that the comparison state of the inspector control 530 is unlocked. However, since the user interface 500 is the first stage of the walkthrough, there is no comparison state displayed in the inspector control 530. There may be some visual indication within the inspector control 530 to also reflect the current state. For instance, element 532 shows that the inspector control 530 is currently unlocked.

Figure 6:
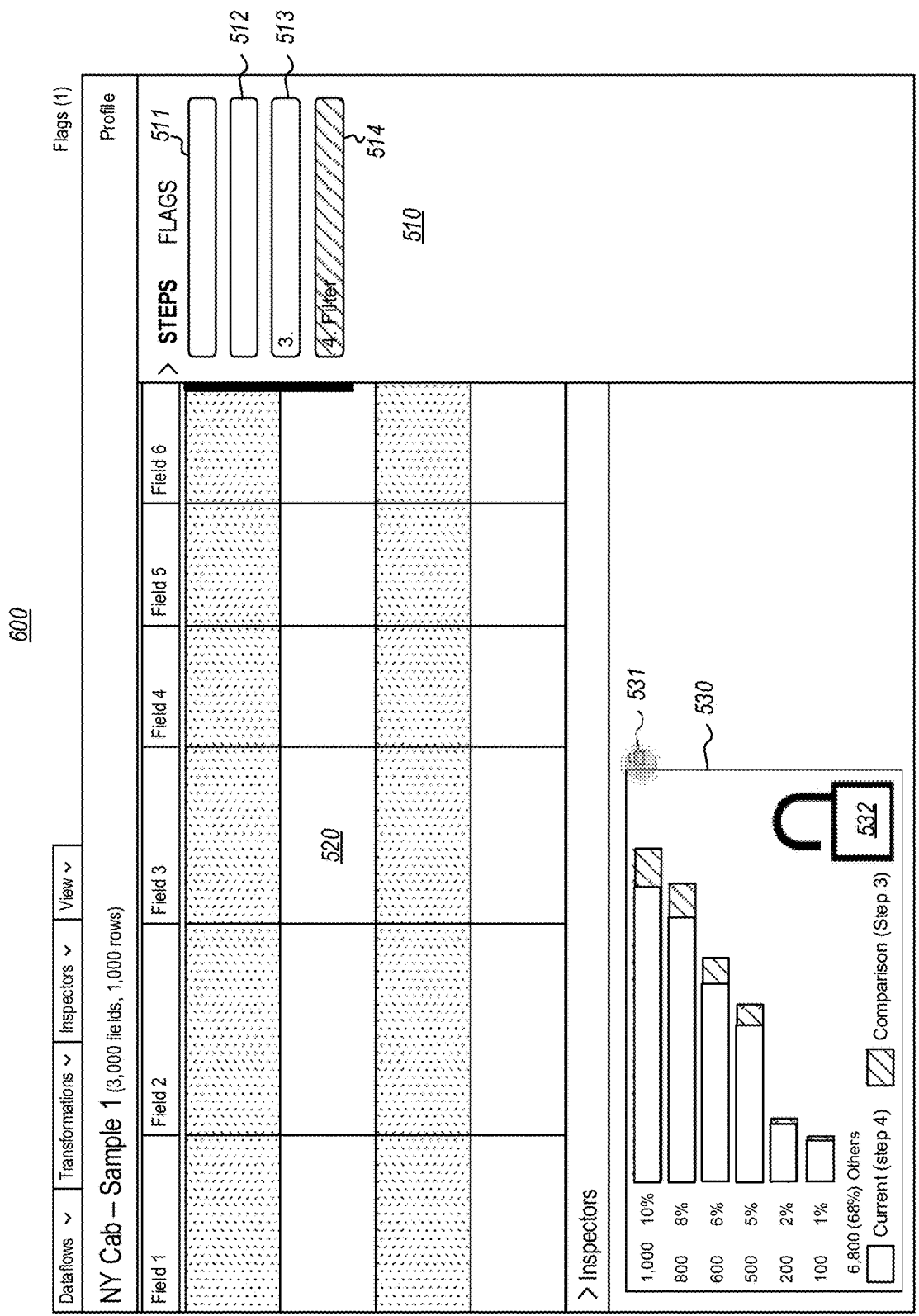

FIG. 6 illustrates a user interface 600, which is similar to the user interface 500 of FIG. 5, except that the user has caused a fourth transformation (a filter operation) to be performed on the data set. The progress frame 510 has thus been updated to show that a fourth element 514 representing that fourth transformation. Note that now the fourth element 514 is highlighted, representing that the data set frame 520 now shows the data set after the fourth transformation. The inspector control 530 still has an unlocked comparison state, as represented by the lock control 531. Accordingly, the comparison state simply compares the current state with the state (represented by clear-filled boxes) as compared to the prior state (represented by diagonal-line filled boxes when in the unlocked state, or solid filled boxes when the comparison state locked). Apparently, the fourth transformation did not cause a significant change to the state monitored by the inspector control 530.

Figure 7:
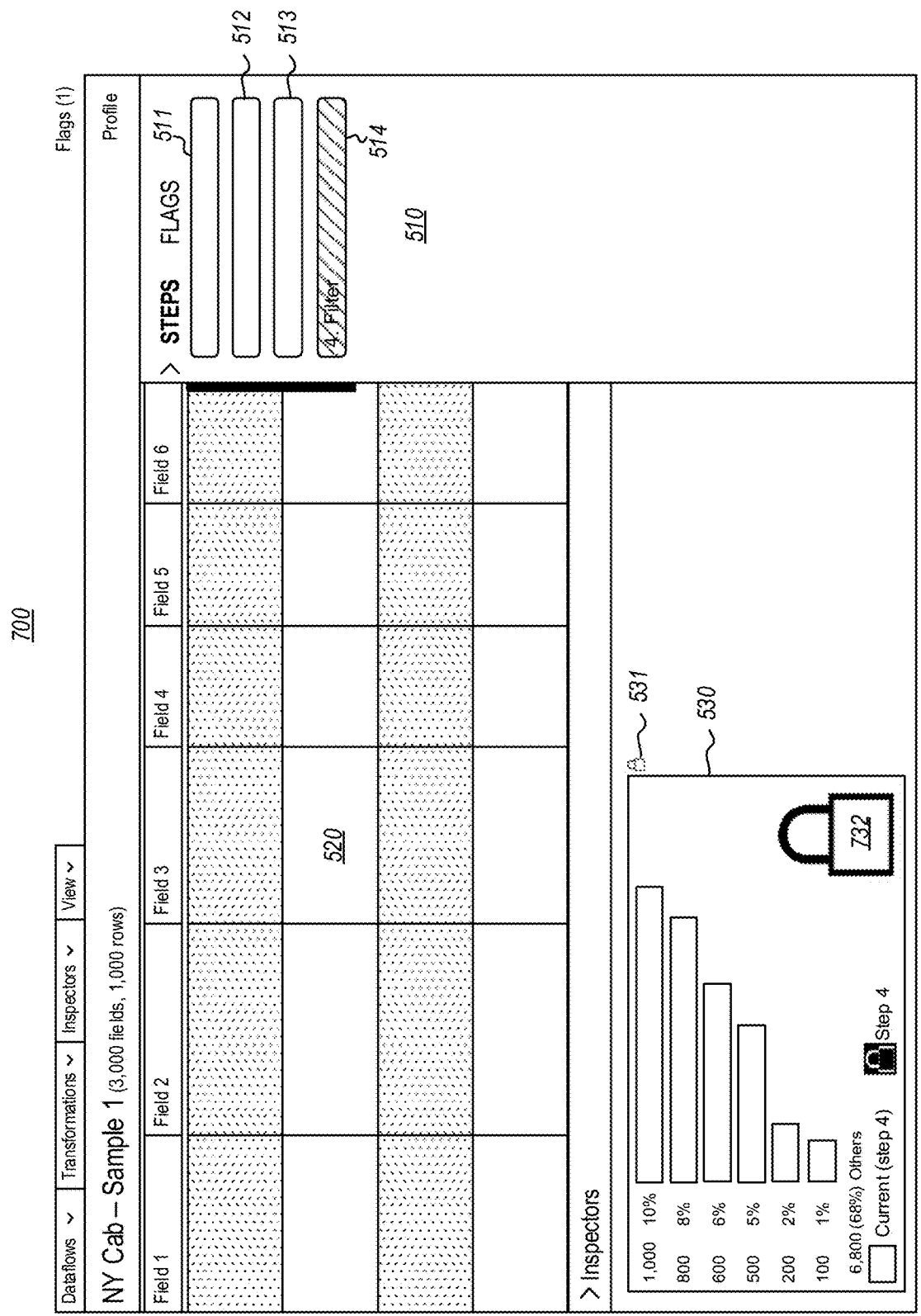

FIG. 7 illustrates a user interface 700, which is similar to the user interface 600 of FIG. 6. Now, however, the user has activated the lock control 531, and thus the lock control 531 shows as locked. Furthermore, a locked icon 732 appears in the inspector control 530 showing that the inspector control 530 has a locked comparison state, which is locked to the state of the data set after the fourth transformation (the filter operation). The user might, for instance, very much like the state of the data set after the fourth transformation, but still want to perform further transformations, while maintaining assurance that the user does not cause the data set to depart too far from the likable state.

Figure 8:
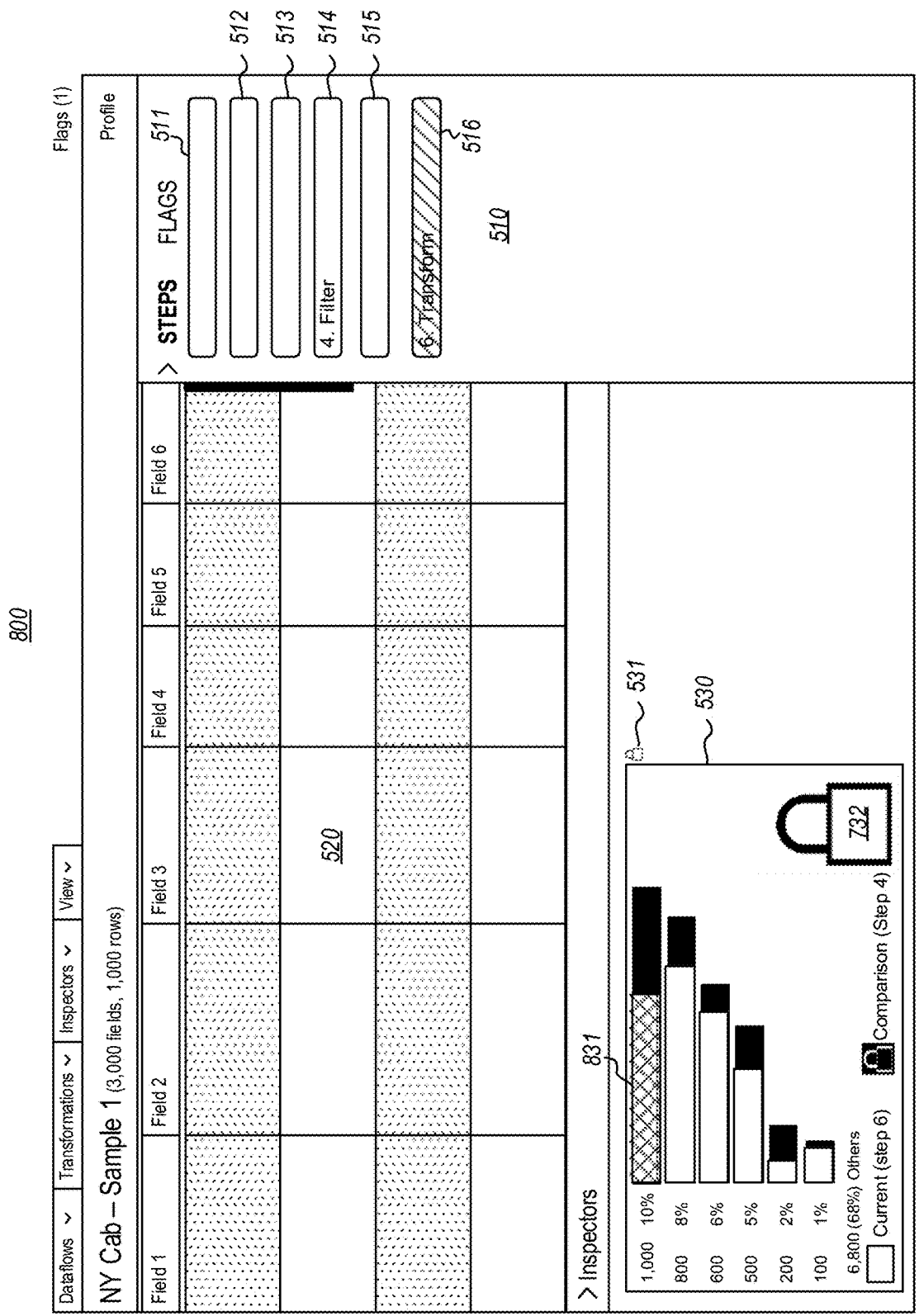

FIG. 8 illustrates a user interface 800, which is similar to the user interface 700 of FIG. 7. The user has applied two further transformations to the data set, as represented by the progress frame 510 including two further elements 515 and 516. The current state of the data set viewed in the data set frame 520 is after the sixth transformation as represented by the element 516 being highlighted. The inspector control 530 remains locked, and so the comparison state of the inspector control shows that view of the data set as it existed at the time the inspector control 530 was locked (e.g., after the fourth transformation—the filter operation). The inspector control 530 also shows a view of the current state of the data set, as represented by the clear-filled boxes, except that a cross-hatching filled box 831 shows a current state of one of the bars has varied more than the threshold from the locked state of that bar. This alerts the user that the state of the data for represented by that bar has now departed very far from the more ideal state that existed when the user activated the comparison lock control 531 to lock the inspector control 530.

Figure 9:
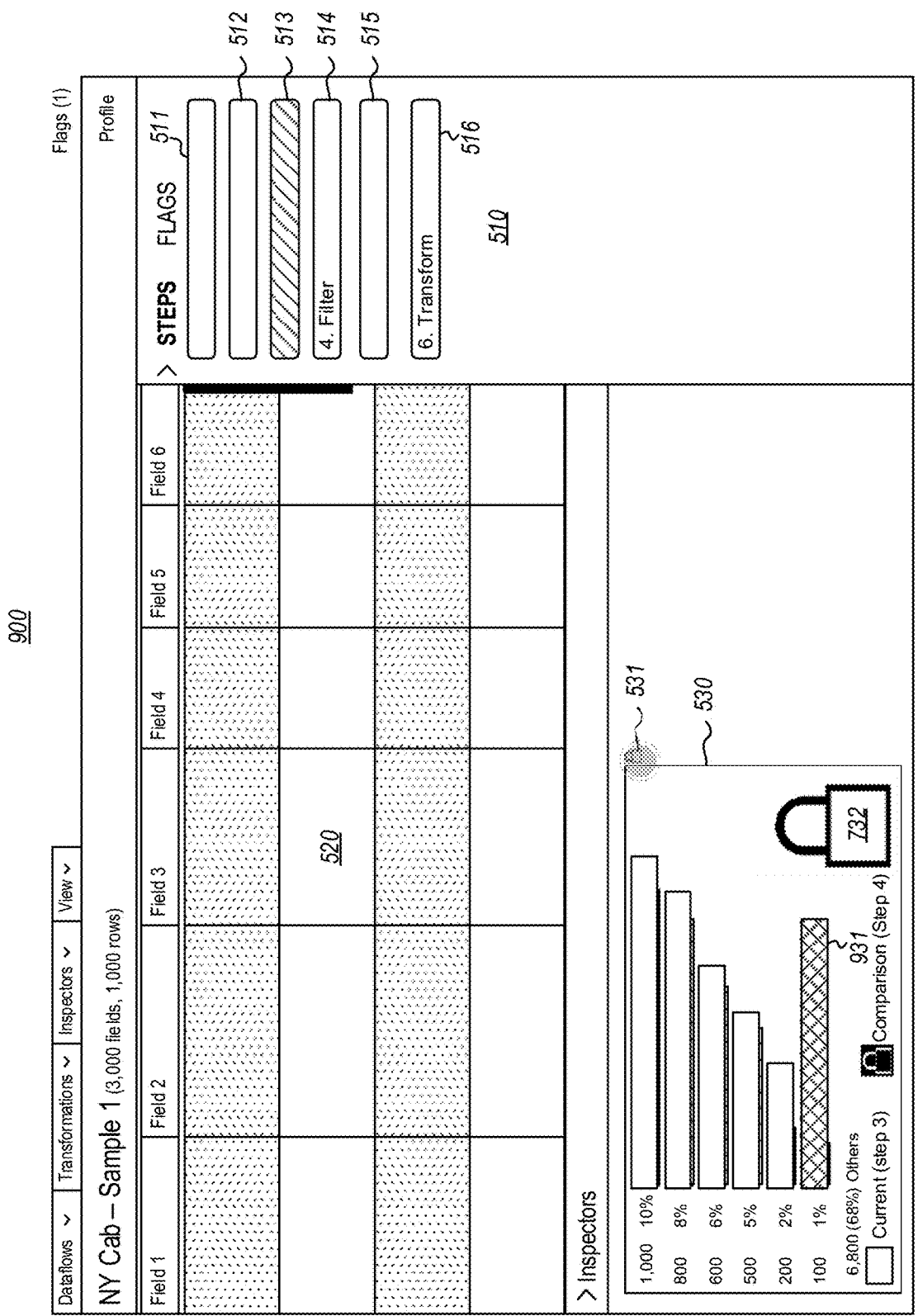

FIG. 9 illustrates a user interface 900, which is similar to the user interface 800 of FIG. 8. The user has now selected the element 513 within the progress pane to navigate the data set back to the state as it existed after the third transformation. The user can thus switch back to previous steps before the desirable state acquired after the fourth transformation. Now, the user can compare again the locked comparison state (represented by the diagonal filled lines in the inspector control 530) with the current state of the data set as viewed in the data set view 520. In this case, the current state of the data set as that which existed after the third transformation. Here, again, there is a cross-hatched-filled bar 931, which indicates an alert showing that the bar 931 that is alerted to represent state that is far from the more ideal state for the data represented by that bar. Accordingly, the user now knows that the filtering operating of the fourth transformation caused a very positive change that portion of the data.

Figure 10:
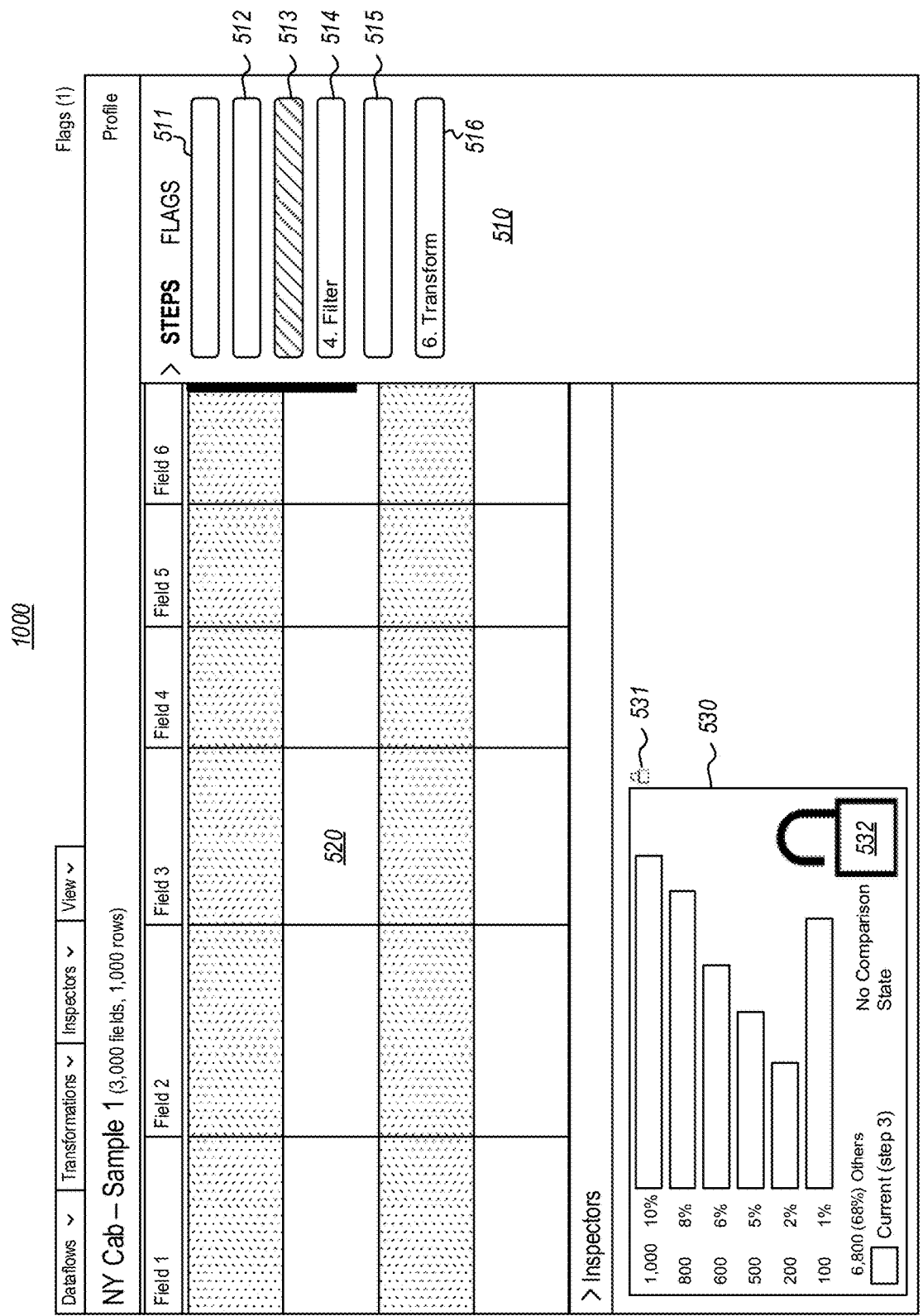

FIG. 10 illustrates a user interface 1000 that is similar to the user interface 900 of FIG. 9. However, now, the user has selected the lock control 531 again to unlock the inspector control 530. This, for now, removes any view of a comparison state in the inspect control 530. Alternatively, unlocking the comparison state might return the comparison state to some default value that depends on the current state being viewed. For instance, since the current state is just after the third transformation (as represented by element 513 being highlighted), the comparison state may be of the state just after the second transformation.

The principles described herein are not limited to any particular type of inspector control, nor any particular visualization of data that is shown in the inspector control. While the example of FIGS. 5 through 10 shows a bar chart, the inspector control may include any appropriate mechanism for providing a view on at least a portion of the data set. The most appropriate view may depend on the nature of the underlying data, the portion that is being inspected, and the preferences of the user. Examples of other visualizations of state inspection include scatter charts, line graphs, pie graphs, statistics, and so forth, without any limitation whatsoever. The user may be permitted to change the visualization of the inspector control.

Accordingly, the principles described herein provide a user interface that includes an effective mechanism for comparing state of a data set against a comparison state. The comparison state may be locked, such that no matter what the current state of the data set currently being viewed, the inspector control may compare changes against that locked comparison state. A user might lock the comparison state, for instance, if the state of that data set is desirable. When navigating, if the data set departs from the data set too far from the locked state, the user might be alerted. This allows the user to know when there has been a transformation that has caused a part of the data to depart too far from a more ideal state (if the current state is after the locked state), or which transformations have enabled the data set to acquire the more data state (if the current state is before the locked state).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computing system comprising:
one or more processors; and
one or more computer-readable media having thereon computer-executable instructions that, when executed by the one or more processors, configure the computing system to display a user interface that enables the following:
displaying within the user interface a data set frame, a progress frame, and an inspector frame, the inspector frame displaying a state of at least a portion of a data set, the inspector frame enabled to display a comparison state of the data set, and the progress frame displaying a selectable locking control;
displaying within the progress frame a selectable plurality of transformations of the data set, each transformation of the data set comprising a particular state of the data set at an associated particular time;
receiving a selection in the progress frame of a selected transformation from the plurality of transformations of the data set;
in response to selection in the progress frame of the selected transformation, displaying at least a portion of data from the selected transformation of the data set within the data set frame;
displaying within the inspector frame the locking control in an unlocked state and displaying a comparison state of the at least the portion of the data from the selected transformation, the comparison state comparing the state of the at least the portion of the data from the selected transformation with a state of the same portion of the data set at the point of an immediately prior transformation of the data set;
receiving locking input to the locking control, the locking input selecting a particular transformation of the data set as a basis comparison state such that until the comparison state is unlocked, a selection of another selected transformation of the data set will cause a comparison of the another selected transformation of the data set with the particular transformation of the data set to be displayed in the inspector frame; and
in response to receiving the selection in the progress frame of the another selected transformation, displaying at least a portion of data from the another selected transformation of the data set within the data set frame and displaying in the inspector frame the comparison of the another selected transformation of the data set with the particular transformation of the data set.

2. The computing system in accordance with claim 1, the navigation control causing the plurality of transformations when navigating forwarding in time.

3. The computing system in accordance with claim 2, wherein when the comparison state is unlocked, the comparison state is a state of the at least the portion of the data set prior to a current transformation.

4. The computing system in accordance with claim 2, wherein when the comparison state is unlocked, the inspector frame displays only a current state of the at least the portion of the data set.

5. The computing system in accordance with claim 1, the navigation control also allowing for navigation of the data set backwards in time to prior transformations.

6. The computing system in accordance with claim 5, the comparison state being for a transformation that is after in time a current navigation of the data set.

7. The computing system in accordance with claim 5, the comparison state being for a transformation that is before in time a current navigation of the data set.

8. The computing system in accordance with claim 1, wherein if a navigated state of the at least the portion of the data set as shown in the inspector frame differs from the comparison state by more by more than a threshold, an alert is visualized in the inspector frame.

9. The computing system in accordance with claim 8, the threshold being a function of a plurality of state dimensions.

10. The computing system in accordance with claim 8, the threshold being at least partially customizable.

11. The computing system in accordance with claim 1, the visualization of the comparison state being different dependent on whether the comparison state is locked or unlocked.

12. The computing system in accordance with claim 1, the state being an aggregated state of the at least the portion of the data set.

13. The computing system in accordance with claim 1, the state being a direct state of the at least the portion of the data set.

14. The computing system in accordance with claim 1, the at least a portion of the data set being a column of a table.

15. The computing system in accordance with claim 1, the comparison lock control and the comparison unlock control being a same control.

16. The computing system in accordance with claim 1, the at least a portion of the data set being a database.

17. The computing system in accordance with claim 1, the inspector frame being a first instance of an inspector frame, the comparison state being a first comparison state, the comparison lock control being a first instance of a comparison lock control, the user interface further comprising:

a second instance of an inspector frame that visualizes a state of at least a portion of the data set as that data set is navigated by the navigation control, and at least under some circumstances, visualizes a second comparison state of the at least the portion of the data set;

a second instance of a comparison lock control that causes the second comparison state of the data set to be locked at a particular second comparison state regardless of the navigation control navigating the data set, such that until the comparison state is unlocked, a current state of the data set as visualized in the second instance of an inspector frame is visualized along with a visualization of the locked second comparison state, such that the second comparison state of the second instance of an inspector frame may be locked independently of the first comparison state of the first inspector frame.

18. The computing system in accordance with claim 17, the comparison unlock control being a first instance of a comparison unlock control, the user interface further comprising:

a second instance of a comparison unlock control that unlocks a previously locked second comparison state of the at least the portion of the data set.

19. A method for transforming a data set using a user interface, the method comprising:

displaying within the user interface a data set frame, a progress frame, and an inspector frame, the inspector frame displaying a state of at least a portion of a data set and the inspector frame enabled to display a comparison state of the data set, and the progress frame displaying a selectable locking control;

displaying within the progress frame a selectable plurality of transformations of the data set, each transformation of the data set comprising a particular state of the data set at an associated particular time;

receiving a selection in the progress frame of a selected transformation from the plurality of transformations of the data set;

in response to selection in the progress frame of the selected transformation, displaying at least a portion of data from the selected transformation of the data set within the data set frame;

displaying within the inspector frame the locking control in an unlocked state and displaying a comparison state of the at least the portion of the data from the selected transformation, the comparison state comparing the state of the at least the portion of the data from the selected transformation with a state of the same portion of the data set at the point of an immediately prior transformation of the data set;

receiving locking input to the locking control of the user interface, the locking input selecting a particular transformation of the data set as a basis comparison state such that until the comparison state is unlocked, a selection of another selected transformation of the data set will cause a comparison of the another selected transformation of the data set with the particular transformation of the data set to be displayed in the inspector frame; and in response to receiving the selection in the progress frame of the another selected transformation, displaying at least a portion of data from the another selected transformation of the data set within the data set frame and displaying in the inspector frame the comparison of the another selected transformation of the data set with the particular transformation of the data set.

20. A computer program product comprising one or more computer-readable storage media having thereon computer-executable instructions that are structured such that, when executed by one or more processors of a computing system, cause the computing system to perform steps for transforming a data set using a user interface, the steps comprising:

displaying within the user interface a data set frame, a progress frame, and an inspector frame, the inspector frame displaying a state of at least a portion of a data set and the inspector frame enabled to display a comparison state of the data set, and the progress frame displaying a selectable locking control;

displaying within the progress frame a selectable plurality of transformations of a data set, each transformation comprising a particular state of the data set at an associated particular time;

receiving a selection in the progress frame of a selected transformation from the plurality of transformations of the data set;

in response to selection in the progress frame of the selected transformation, displaying at least a portion of data from the selected transformation of the data set within the data set frame;

displaying within the inspector frame the locking control in an unlocked state and displaying a comparison state of the at least the portion of the data from the selected transformation, the comparison state comparing the state of the at least the portion of the data from the selected transformation with a state of the same portion of the data set at the point of an immediately prior transformation of the data set;

receiving locking input to the locking control of the user interface, the locking input selecting a particular transformation of the data set as a basis comparison state such that until the comparison state is unlocked, a selection of another selected transformation of the data set will cause a comparison of the another selected transformation of the data set with the particular transformation of the data set to be displayed in the inspector frame; and in response to receiving the selection in the progress frame of the another selected transformation, displaying at least a portion of data from the another selected transformation of the data set within the data set frame and displaying in the inspector frame the comparison of the another selected transformation of the data set with the particular transformation of the data set.

* * * * *